Aug. 21, 1962  A. W. TRONNIER  3,049,975
FOUR-COMPONENT WIDE-ANGLE OBJECTIVE LENS OF GAUSSIAN TYPE
Filed Oct. 20, 1958
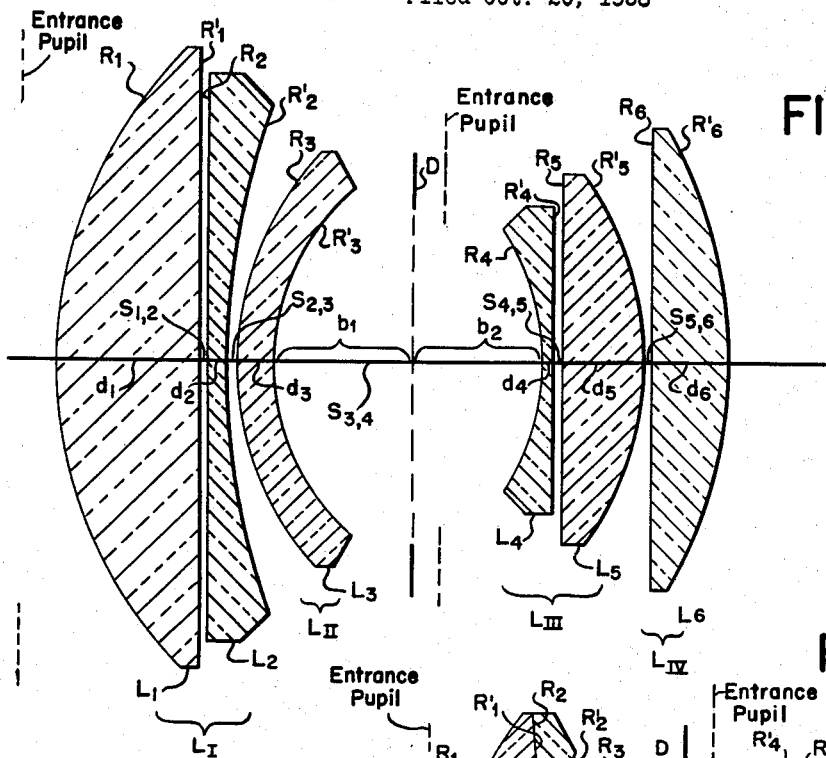
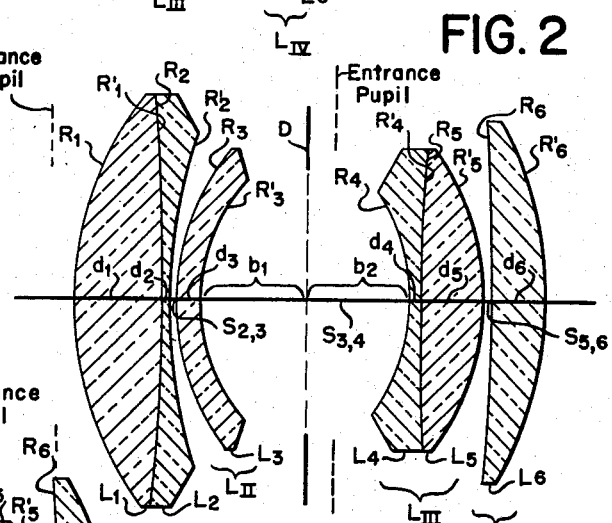
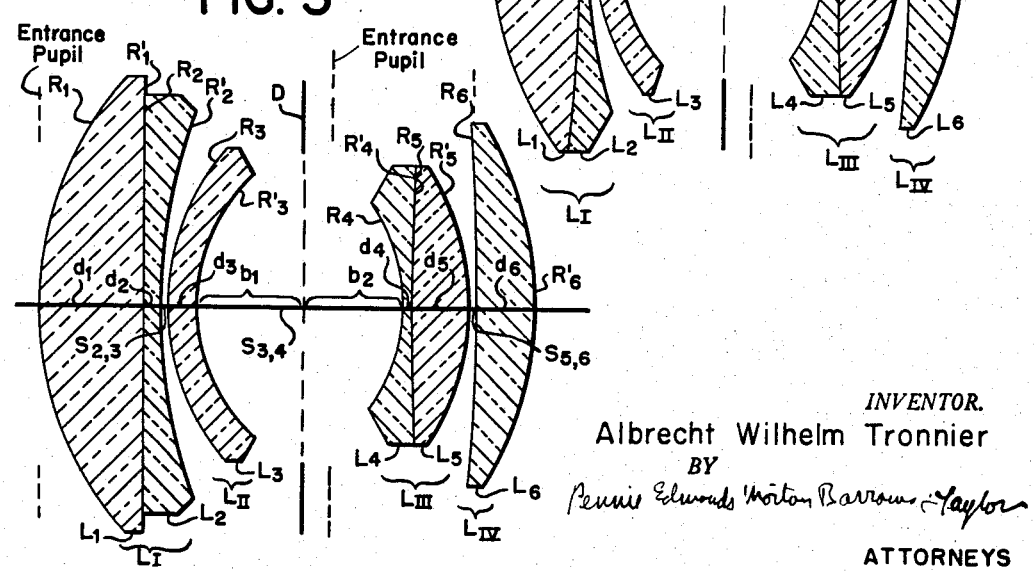
INVENTOR.
Albrecht Wilhelm Tronnier
BY
Pennie Edmonds Morton Barrows & Taylor
ATTORNEYS

United States Patent Office 3,049,975
Patented Aug. 21, 1962

3,049,975
FOUR-COMPONENT WIDE-ANGLE OBJECTIVE LENS OF GAUSSIAN TYPE
Albrecht Wilhelm Tronnier, New York, N.Y., assignor to Farrand Optical Co., Inc., New York, N.Y., a corporation of New York
Filed Oct. 20, 1958, Ser. No. 768,336
12 Claims. (Cl. 88—57)

The present invention relates to a four-component objective of modified Gaussian type of that particular class in which a doublet of meniscus form and positive power concave toward the diaphragm position and composed of two single lens elements of opposite sign, is followed by a single negative meniscus, also concave toward the diaphragm position, whereas the diaphragm space is closed on the short conjugate side by means of doublet of meniscus form and negative power which is concave toward the diaphragm position and which is likewise composed of two single lens elements of opposite powers. This latter doublet possesses divergent power as a whole and is followed on the short conjugate side of the system by a single convergent lens of unequal surface curvatures constituting the last lens element of the system.

Objectives of this class thus have a basic makeup which may be indicated the notation 2-1-diaphragm-2-1 in which the numbers represent the number of lens elements in each component. Within this class of objectives as heretofore applied to the provision of photographic objectives, two types may be distinguished. Of these prior art types, one relates to very high speed systems of narrow field, whereas the other is directed to the provision of moderate relative apertures and wide field angles.

The first of these provides relative apertures from 1:2.3 up to approximately 1:1.6 with useful total field angles of from 25° to 30°, whereas the other provides relative apertures of the order of 1:3 with a total field angle of some 55°. The first and faster of these types is provided with relatively low surface powers at the exterior air glass surfaces of the individual components in such fashion that the sum of the powers of the convergent front surface presented toward the object and of the last air glass surface on the image side, likewise convergent, is less than 1.6 times the equivalent power $\Phi$ of the entire system. In addition, the sum of the powers of the convergent exterior surfaces of the two meniscus shaped inner components adjacent the diaphragm is less than $3.8\Phi$. Moreover, the absolute value of the surface power sum of the two divergent air-glass surfaces presented to the diaphragm is less than $5.2\Phi$. An example of this first prior art type of objective is disclosed in British Patent No. 480,643.

The second type above referred to exhibits in contrast substantially larger surface powers in the corresponding components thereof, consistently with the larger useful field angles achieved. The corresponding power relations here exceed in each case the limits specified in the preceding paragraph.

Modified Gaussian objectives of the first prior art type above-described have not achieved great practical importance. Those of the second type have been the object of numerous proposals, since for moderate relative apertures of from approximately $f/3$ to $f/2.8$ they provide a useful field of 55° or more within which a substantially improved imagery can be achieved by comparison with that attainable with triplet variations of the same relative aperture. The present invention relates to a further improvement of objectives of this particular modified Gaussian type.

Previous proposals for such lenses, i.e. of the second type above broadly described, have been subject to the disadvantage that toward the edge portion of the field and with increasing field angle there occurs a strong tendency toward undercorrection of the astigmatic differences, particularly of the meridional image surface. Because of the strong exterior coma occurring in wide aperture skew bundles of rays passed through Gaussian objectives of this particular type, which are asymmetric in the diaphragm plane, a diminution of this astigmatic under-correction of the edge portion of the field was heretofore obtainable in such objectives only at the cost of a reduction in the useful aperture of the lateral ray bundles, i.e., at the cost of image brightness in the lateral portions of the field, such improvement being achieved by introduction of supplementary vignetting. Such vignetting is very disadvantageous for color photography and produces particularly unsatisfactory results in the case of exposures taken with large relative apertures, as is necessary in the case of unsatisfactory lighting conditions.

The present invention provides particular improvement in this respect, permitting improved use of the wide angle bundles of the high angle edge field rays. According to the invention this improvement, of particular significance for photography, is achieved by a novel distribution of surface powers between the front components and the components following the diaphragm. In this way the exterior coma in the wide aperture lateral bundles is so altered that the exterior portions of the cross sections (apertures) of wide angle skew bundles can be successfully employed for imaging so that the undesired vignetting and consequent reduction in brightness in the edge portions of the field is substantially suppressed.

It should be noted that by "exterior coma" is here meant that form of comatic lateral aberration in which the intersections of the comatic rays with the image plane diverge from the intersections of the principal ray, being farther from the optical axis than the latter. Numerically this so-called exterior coma is indicated with a positive sign, since the separation of these comatic intersections with the image plane are farther from the axis than the corresponding intersections of the principal rays with the image plane.

The invention will now be further described by reference to the accompanying drawings, in which FIGS. 1, 2 and 3 are respectively axial sections through three objective systems embodying the present invention.

In each of these figures, the long conjugate side of the lens is at the left.

The lens of the invention comprises four components, numbered $L_I$ to $L_{IV}$ from the long to the short conjugate side of the system. In the embodiments illustrated, components $L_I$ and $L_{III}$ comprise each two elements while components $L_{II}$ and $L_{IV}$ comprise each one element, so that the lens includes six elements $L_1$ to $L_6$, numbered, again, from the long to the short conjugate side of the system.

The radii of curvature of the front surfaces of the elements $L_1$ to $L_6$ are respectively identified by the letter R with corresponding subscripts, and the radii of curvature of the rear surfaces of these elements are identified by R′ with similar subscripts. The axial thicknesses of the elements are identified by the letter $d$ with corresponding subscripts 1 to 6 respectively, and the axial spacings of the elements are identified by the letter $s$ with double subscripts identifying the elements preceding and following such spacings. The position of the diaphragm D is indicated by division of the spacing $S_{3,4}$ into the portions $b_1$ and $b_2$ preceding and following the diaphragm position.

Individual glass-air surface powers in diopters will be denoted by the symbol $\phi$, unprimed for front surfaces and primed for rear surfaces, and with the subscripts 1 to 6 for the lens elements in question. For a front surface, $R_x$ say, the surface power $\phi_x$ is given in diopters by the usual formula $$\phi_x = \frac{1000(n_x - 1)}{R_x}$$

in which $n_x$ is the index of refraction of the glass bounded by that surface and $R_x$ is its radius of curvature in millimeters. For a rear surface, $R'_x$ say, the power $\phi'_x$ is given in diopters by the corresponding formula $$\phi'_x = \frac{1000(1 - n_x)}{R'_x}$$

in which again $n_x$ is the index of refraction of the glass bounded by that surface and $R'_x$ is its radius of curvature in millimeters. The powers of the six elements, identified by the letter $\phi$ with subscripts 1 to 6 in parenthesis for the element in question, are defined for each as the sum of the powers of the two surfaces of that element. Thus $$\phi_{(x)} = \phi_x + \phi'_x$$

Similarly the powers of the four components will be written $\phi_{(I)}$, $\phi_{(II)}$, $\phi_{(III)}$ and $\phi_{(IV)}$. The power of each component in the sum of the powers of the elements included in it.

To return now to the distinguishing features of the invention, the lens criteria thereof specify, consistently with the principles hereinabove set forth, that the objective of the invention is to possess such a distribution of surface powers for the outer (i.e. front and rear exterior) surfaces of the front assembly and of the rear assembly that the absolute values of the sums of those powers shall both lie between 1.35 and 1.9 times the equivalent power $\Phi$ of the objective. The objective of the invention therefore satisfies the following relations:

$$1.35\Phi < -(\phi_1 + \phi'_3) < 1.9\Phi$$
$$1.35\Phi < -(\phi_4 + \phi'_6) < 1.9\Phi \quad (1)$$

At the same time, the surface powers $\phi_3$ and $\phi'_5$ of the exterior surfaces $R_3$ and $R'_5$ of the inner components $L_{II}$ and $L_{III}$ are so related that their difference $\phi_3$ minus $\phi'_5$ is more than 10% but less than 48% of the equivalent total power $\Phi$. Expressed algebraically:

$$0.10\Phi < (\phi_3 - \phi'_5) < 0.480\Phi \quad (2)$$

Moreover, the two air-glass surfaces $R'_3$ and $R_4$ which limit the diaphragm space possess a very low asymmetry such that the absolute value of the difference of the numerical values of their surface powers $\phi'_3$ and $\phi_4$, while greater 8% thereof, is less than 24% of the equivalent power $\Phi$ of the objective. Algebraically this relation may be expressed as follows:

$$0 < [|\phi'_3| - |\phi_4|] < 0.240\Phi \quad (3)$$

By means of the new distribution of powers set forth in relations 1 for the outer surfaces of the front and rear assemblies the invention achieves a new and striking improvement in the flattening of the meridional (tangential) field.

Additionally, by means of the new distribution of powers between the strong outer surfaces of the inner components $L_{II}$ and $L_{III}$ set forth in relation 2 above and by means of the particular dimensioning of the power asymmetry between the two sides of the diaphragm thus indicated, there is achieved a very substantial increase in the useful lateral bundle cross sections without entailing in consequence an increase in the residual aberrations within the range thus increased.

In accordance with the invention a further improvement in image quality is obtainable by so forming the two exterior surfaces of the complete objective that the sum of the absolute values of their radii $R_1$ and $R'_6$ is greater than 85% of the equivalent focal length of the entire system (denoted $f$), but less than 3.5 times the diameter of the entrance pupil (denoted $D_{ep}$). Algebraically:

$$0.850f < (R_1 + |R'_6|) < 3.5 D_{ep} \quad (4)$$

For photographic applications of these objectives with relative apertures as customarily used of $f/2.8$, the equivalent focal length amounts to 2.8 times this diameter of the entrance pupil. Consequently 3.5 times the entrance pupil diameter amounts to 3.5/2.8 times $f$, or $1.25f$. The last algebraic inequality 4 can, therefore, be written as follows:

$$0.850f < (R_1 + |R'_6|) < 1.25f \quad (5)$$

By means of this particular dimensioning of radii, the invention makes it possible to hold to relatively small values the residual zonal aberrations even for skew rays directed to the corners of the field. Consequently, the curve of residual aperture errors for skew rays is flattened out. This produces a great improvement in the lateral image formation, of particular value in photography.

Objectives of the second known 2-1-diaphragm-2-1 modified Gaussian type above referred to as shown by recent developments in the Example 3 in French Patent No. 1,101,508, or in the Example 4 set out in United States Patent No. 2,748,656, display, in striking contrast to the present invention, great differences in surface powers of their corresponding air glass surfaces, both in front of and behind the diaphragm, showing a further substantial increase in asymmetry of the whole lens design for a lens having already a strongly asymmetric fundamental lens arrangement. Thus, for example, the absolute value of the difference of the surface powers of the two divergent innermost surfaces $\phi'_3$ and $\phi_4$ amounts in the objective above mentioned in United States Patent No. 2,748,656 to no less than 56.2675% of the equivalent power of the complete objective, and in the case of the third example of the French patent indeed to 70.6050% of that equivalent power. Moreover, the difference between the surface powers of the convergent exterior surfaces $R_3$ and $R'_5$ of the inner components amounts in Example 4 of United States Patent No. 2,748,656 to 62.4741%, and in Example 3 of the French Patent No. 1,101,508 to 70.0167%, of the equivalent total power of the lens. In these two particular prior art objectives moreover the absolute value of the sum $(R_1 + |R'_6|)$ of the outside surfaces is substantially less than 85% of the equivalent focal length of the complete objective. Consequently, these objectives of the prior art also exhibit the strong zonal change in the variation of their lateral aperture errors which is so prejudicial to good edge field definition. In practice this can be alleviated with these prior art lenses only by severely stopping down the system. This severe disadvantage is largely obviated for the first time by means of the present invention, in which there is achieved a successful balancing of the asymmetry characteristics for lenses of the type here under construction.

Five examples of lenses according to the invention will now be described. In the data of these examples, the glasses employed are identified by means of their indices of refraction $n$ for the yellow $d$-line of the helium spectrum, having a wavelength $\lambda$ of 5876 Angstrom units, and by means of their Abbe numbers $\nu$, with subscripts 1 to 6 on the symbols $n$ and $\nu$ identifying the elements in question.

EXAMPLE 1

The first example to be considered, and of which the general form is shown in FIG. 1, is a lens having a relative aperture of approximately $f/3$ and a total field angle of approximately 60°. The properties of the lens will first be stated, in the accompanying Table 1, in terms of the approximate values of the powers $\phi_{(1)}$ to $\phi_{(6)}$ of its elements, and in terms of the approximate values of the powers $\phi_{(I)}$ to $\phi_{(IV)}$ of its four components. The equivalent total power of the lens is $\Phi$.

*Example 1.—Table 1*

| | |
|---|---|
| $\phi_{(1)} = +1.9\Phi$ | $\phi_{(I)} = +0.8\Phi$ |
| $\phi_{(2)} = -1.1\Phi$ | |
| $\phi_{(3)} = -0.9\Phi$ | $\phi_{(II)} = \phi_{(3)}$ |
| $\phi_{(4)} = -3.4\Phi$ | |
| $\phi_{(5)} = +2.3\Phi$ | $\phi_{(III)} = -1.1\Phi$ |
| $\phi_{(6)} = +1.4\Phi$ | $\phi_{(IV)} = \phi_{(6)}$ |

Particular features of the lens of this Example 1 are the power sums $[|\phi'_3| - |\phi_4|]$ and $(\phi_3 - \phi'_5)$ which possess values as follows, satisfying inequality relations 3 and 2 above respectively:

$$[|\phi'_3| - |\phi_4|] = 0.15\Phi$$
$$(\phi_3 - \phi'_5) = 0.3\Phi$$

For achievement of third order correction in the lens of Example 1, the component and element powers of Table 1, restated to an accuracy of three significant figures, are distributed among the individual surfaces in accordance with the following Table 2:

*Example 1.—Table 2*

| | | |
|---|---|---|
| $\phi_1 = +1.68\Phi$ | $\phi_{(1)} = +1.88\Phi$ | |
| $\phi'_1 = +0.20\Phi$ | | |
| $\phi_2 = -0.19\Phi$ | | $\phi_{(I)} = +0.80\Phi$ |
| $\phi'_2 = -0.89\Phi$ | $\phi_{(2)} = -1.08\Phi$ | |
| $\phi_3 = +2.47\Phi$ | | |
| $\phi'_3 = -3.35\Phi$ | $\phi_{(3)} = -0.88\Phi$ | $= \phi_{(II)}$ |
| $\phi_4 = -3.20\Phi$ | | |
| $\phi'_4 = -0.20\Phi$ | $\phi_{(4)} = -3.42\Phi$ | |
| $\phi_5 = +0.18\Phi$ | | $\phi_{(III)} = -1.08\Phi$ |
| $\phi'_5 = +2.16\Phi$ | $\phi_{(5)} = +2.34\Phi$ | |
| $\phi_6 = -0.20\Phi$ | | |
| $\phi'_6 = +1.58\Phi$ | $\phi_{(6)} = +1.38\Phi$ | $= \phi_{(IV)}$ |

With data of Table 2, the relations 2 and 3 respectively assume the following forms:

$$(\phi_3 - \phi'_5) = 2.47\Phi - 2.16\Phi = 0.31\Phi$$
$$[|\phi'_3| - |\phi_4|] = 3.35\Phi - 3.20\Phi = 0.15\Phi$$

To permit the use of commercially available glasses there may be selected for the elements $L_1$ to $L_6$ glasses having the approximate indices $n_1$ to $n_6$ respectively set forth in the following Table 3:

*Example 1.—Table 3*

$n_1 = 1.72$
$n_2 = 1.66$
$n_3 = 1.76$
$n_4 = 1.76$
$n_5 = 1.66$
$n_6 = 1.74$

The dimensions indicated for the radii of curvature of the various surfaces, as multiples of the equivalent focal length $f$ of the entire lens, will then be as set forth in the following Table 4:

*Example 1.—Table 4*

$R_1 = +0.43f$
$R'_1 = -3.6f$
$R_2 = -3.5f$
$R'_2 = +0.74f$
$R_3 = +0.31f$
$R'_3 = +0.23f$
$R_4 = -0.24f$
$R'_4 = +3.8f$
$R_5 = +3.7f$
$R'_5 = -0.31f$
$R_6 = -3.7f$
$R'_6 = -0.47f$

With due provision for the lens thicknesses and spacings required in practice and for actual index values, the foregoing approximate data for the lens of Example 1 leads to the objective form set out in the following Table 5, wherein linear dimensions are given as multiples of the equivalent focal length $f$ of the objective.

*Example 1.—Table 5*

| Element | Radius | Thickness $d$ or spacing $S$ | Index of refraction | Abbe number |
|---|---|---|---|---|
| $L_1$ | $R_1 = +0.43f$ $R'_1 = 3.60f$ | $d_1 = 0.117f$ $S_{1,2} = 0.001f$ | $n_1 = 1.718$ | $\nu_1 = 50.2$ |
| $L_2$ | $R_2 = -3.50f$ $R'_2 = +0.74f$ | $d_2 = 0.013f$ $S_{2,3} = 0.001f$ | $n_2 = 1.664$ | $\nu_2 = 42.0$ |
| $L_3$ | $R_3 = +0.306f$ $R'_3 = +0.227f$ | $d_3 = 0.048f$ $S_{3,4} = 0.277f$ | $n_3 = 1.759$ | $\nu_3 = 26.6$ |
| $L_4$ | $R_4 = -0.237f$ $R'_4 = +3.80f$ | $d_4 = 0.013f$ $S_{4,5} = 0.001f$ | $n_4 = 1.761$ | $\nu_4 = 26.4$ |
| $L_5$ | $R_5 = +3.70f$ $R'_5 = -0.307f$ | $d_5 = 0.083f$ $S_{5,6} = 0.004f$ | $n_5 = 1.662$ | $\nu_5 = 36.0$ |
| $L_6$ | $R_6 = -3.60f$ $R'_6 = -0.469f$ | $d_6 = 0.061f$ | $n_6 = 1.742$ | $\nu_6 = 45.0$ |

The lens of the foregoing Table 5 is distinguished by relatively small partial surface coefficients of its aberrations. These, in addition to their favorable small values, are characterized by a particularly advantageous distribution among the various surfaces of the system. The objective is characterized by anastigmatic image flattening extending across the desired wide field of some 60°.

EXAMPLE 2

In the following Example 2, computed for a focal length $f$ of 100 mm., the adjacent inner radii of the two doublets are made equal so that the two doublets may have the adjacent surfaces of their two elements cemented together.

In addition to this simplification, Example 2 employs the same glass for the elements $L_3$ and $L_4$ adjacent the diaphragm and the same length of radii for the two strongly convergent exterior surfaces of the inner components $L_{II}$ and $L_{III}$. The general form of the lens of Example 2 is shown in FIG. 2.

These simplifications, which are set forth in the following Table 6 giving complete data for the lens of Example 2 on the assumption of a focal length $f$ of 100 mm., can be accepted in the lens of the invention without sacrifice of image quality, even in the lens of aperture $f/2.8$ having a useful total image field of 61° which this Example 2 represents.

Example 2.—Table 6

| Element | Radius, millimeters | Thickness d or spacing S, millimeters | Index of refraction | Abbe number |
|---|---|---|---|---|
| $L_1$ | $R_1 = +42.8325$ | $d_1 = 11.6958$ | $n_1 = 1.7200$ | $\nu_1 = 50.3$ |
|  | $R'_1 = -360.783$ | $S_{1,2} = 0$ |  |  |
| $L_2$ | $R_2 = -360.783$ | $d_2 = 1.3042$ | $n_2 = 1.6676$ | $\nu_2 = 41.9$ |
|  | $R'_2 = +74.7543$ | $S_{2,3} = 0.1294$ |  |  |
| $L_3$ | $R_3 = +30.7973$ | $d_3 = 4.7330$ | $n_3 = 1.7618$ | $\nu_3 = 26.5$ |
|  | $R'_3 = +22.7214$ | $S_{3,4} = 27.7134$ |  |  |
|  |  | $= 14.1444$ $(b_1) + 13.5690$ $(b_2)$ |  |  |
| $L_4$ | $R_4 = -23.7682$ | $d_4 = 1.2989$ | $n_4 = 1.7618$ | $\nu_4 = 26.5$ |
|  | $R'_4 = +360.783$ | $S_{4,5} = 0$ |  |  |
| $L_5$ | $R_5 = +360.783$ | $d_5 = 8.3722$ | $n_5 = 1.6645$ | $\nu_5 = 35.9$ |
|  | $R'_5 = -30.7973$ | $S_{5,6} = 0.4102$ |  |  |
| $L_6$ | $R_6 = -360.783$ | $d_6 = 6.1214$ | $n_6 = 1.7440$ | $\nu_6 = 44.9$ |
|  | $R'_6 = -46.8675$ |  |  |  |

The individual surface powers, and the related element and component powers of the lens of Example 2 are set out in the accompanying Table 7.

Example 2.—Table 7

| | | |
|---|---|---|
| $\phi_1 = +1.681\,321\Phi$ | $\phi_{(1)} = +1.880\,887\Phi$ | |
| $\phi'_1 = +0.199\,566\Phi$ | | $\phi_{(I)} = +0.802\,785\Phi$ |
| $\phi_2 = -0.185\,042\Phi$ | $\phi_{(2)} = -1.078\,102\Phi$ | |
| $\phi'_2 = -0.893\,060\Phi$ | | |
| $\phi_3 = +2.473\,596\Phi$ | $\phi_{(3)} = -0.879\,196\Phi$ | $=\phi_{(II)}$ |
| $\phi'_3 = -3.352\,792\Phi$ | | |
| $\phi_4 = -3.205\,122\Phi$ | $\phi_{(4)} = -3.416\,274\Phi$ | |
| $\phi'_4 = -0.211\,152\Phi$ | | $\phi_{(III)} = -1.074\,432\Phi$ |
| $\phi_5 = +0.184\,183\Phi$ | $\phi_{(5)} = +2.341\,842\Phi$ | |
| $\phi'_5 = +2.157\,659\Phi$ | | |
| $\phi_6 = -0.206\,218\Phi$ | $\phi_{(6)} = +1.381\,237\Phi$ | $=\phi_{(IV)}$ |
| $\phi'_6 = +1.587\,455\Phi$ | | |

The objective of Example 2 conforms to the relations 2 and 3, inasmuch as for this lens:

$$(\phi - \phi'_5) = +0.315937\Phi = 31.59\% \ \Phi$$

and $$[|\phi'_3| - |\phi_4|] = 0.147670\Phi \approx 14.77\% \ \Phi$$

EXAMPLE 3

This lens, like that of Example 2, is of the general form illustrated in FIG. 2.

In the lens of Example 3, likewise designed for an assumed focal length $f$ of 100 mm., there are used the same glasses as in Example 2. Further, as in Example 2, the doublets $L_I$ and $L_{III}$ are in Example 3 of cemented form. In contrast, however, to Example 2, in which the cemented surfaces of both doublets have the same radii, the cemented surfaces of the doublet component $L_{III}$ are in Example 3 provided with a substantially shorter radius of curvature than are the cemented surfaces of doublet $L_{II}$ in that example.

Whereas the objective of Example 2 possesses on the image side an intersection distance amounting to 77.9866% of the effective focal length, a value substantially below $0.8f$, in Example 3 the image side intersection distance (back focal length) for a distant object amounts to 83.8806% of the equivalent focal length (EFL) and, hence, exceeds substantially the value $0.8f$. In consequence, the lens of Example 3 can be used for mirror reflex cameras, since its back focal length on the image side provides space for a reflex mirror between the vertex of the last lens element and the film plane.

As will be apparent in detail from the tables of data presently to be given for Example 3, this example also embodies constructional simplifications achieved by repeated use of particular radii for a number of the lens surfaces, again without reduction in image quality.

The relative aperture of the objective of Example 3 amounts to 1:2.8 for a total useful field angle of $2 \times 30.5°$ or 61°. As further appears from the tabular data, this example is distinguished from Example 2 by the use of flatter curvatures in the front doublet $L_I$ and also in the succeeding components, with the single exception of the cemented pair of surfaces in the doublet $L_{III}$ following the diaphragm.

The complete data of the lens of Example 3 are set out in the accompanying Table 8.

Example 3.—Table 8

| Element | Radius, mm. | Thickness d or spacing S, mm. | Index of refraction | Abbe number |
|---|---|---|---|---|
| $L_1$ | $R_1 = +43.7118$ | $d_1 = 11.9385$ | $n_1 = 1.7200$ | $\nu_1 = 50.3$ |
|  | $R'_1 = -368.2624$ | $S_{1,2} = 0$ |  |  |
| $L_2$ | $R_2 = -368.2624$ | $d_2 = 1.3310$ | $n_2 = 1.6676$ | $\nu_2 = 41.9$ |
|  | $R'_2 = +76.3037$ | $S_{2,3} = 0.1317$ |  |  |
| $L_3$ | $R_3 = +31.4355$ | $d_3 = 3.5726$ | $n_3 = 1.7618$ | $\nu_3 = 26.5$ |
|  | $R'_3 = +23.1920$ | $S_{3,4} = 28.2875$ |  |  |
| $L_4$ | $R_4 = -24.7833$ | $d_4 = 1.3270$ | $n_4 = 1.7618$ | $\nu_4 = 26.5$ |
|  | $R'_4 = +270.4937$ | $S_{4,5} = 0$ |  |  |
| $L_5$ | $R_5 = +270.4937$ | $d_5 = 8.9620$ | $n_5 = 1.6645$ | $\nu_5 = 35.9$ |
|  | $R'_5 = -31.4355$ | $S_{5,6} = 0.1429$ |  |  |
| $L_6$ | $R_6 = -368.2624$ | $d_6 = 7.1655$ | $n_6 = 1.7440$ | $\nu_6 = 44.9$ |
|  | $R'_6 = -48.4337$ |  |  |  |

The individual surface powers and the surface power sums of the objective of Example 3 are set out in the accompanying Table 9.

Example 3.—Table 9

| | | |
|---|---|---|
| $\phi_1 = +1.647\,153\Phi$ | $\phi_{(1)} = +1.842\,666\Phi$ | |
| $\phi'_1 = +0.195\,513\Phi$ | | $\phi_{(I)} = +0.786\,458\Phi$ |
| $\phi_2 = -0.181\,284\Phi$ | $\phi_{(2)} = -1.056\,208\Phi$ | |
| $\phi'_2 = -0.874\,924\Phi$ | | |
| $\phi_3 = +2.423\,379\Phi$ | $\phi_{(3)} = -0.861\,370\Phi$ | $=\phi_{(II)}$ |
| $\phi'_3 = -3.284\,749\Phi$ | | |
| $\phi_4 = -3.073\,838\Phi$ | $\phi_{(4)} = -3.355\,471\Phi$ | |
| $\phi'_4 = -0.281\,633\Phi$ | | $\phi_{(III)} = -0.995\,954\Phi$ |
| $\phi_5 = +0.245\,662\Phi$ | $\phi_{(5)} = +2.359\,517\Phi$ | |
| $\phi'_5 = +2.113\,855\Phi$ | | |
| $\phi_6 = -0.202\,030\Phi$ | $\phi_{(6)} = +1.334\,091\Phi$ | $=\phi_{(IV)}$ |
| $\phi'_6 = +1.536\,121\Phi$ | | |

In accordance with the characteristic features of the invention, the lens of Example 3 satisfies relations 2 and 3 as follows:

$$(\phi_3 - \phi'_5) = 0.309524\Phi = 30.95\% \ \Phi$$
$$[|\phi'_3| - |\phi_4|] = 0.210911\Phi = 21.09\% \ \Phi$$

Moreover, in accordance with relation 5, $$R_1 + R'_6 = 92.15\% f$$

EXAMPLE 4

The general form of this lens is illustrated in FIG. 3.

In this example, the front doublet possesses a somewhat stronger curvature than does the corresponding component in the examples previously discussed. In addition, the lens of Example 4 employs glasses of lower index of refraction. The negative meniscus which follows the front component likewise possesses a stronger curvature than does the corresponding component in Examples 1–3. The pair of adjacent surfaces in the front doublet, which can possess either positive or negative curvature, is in Example 4 plane parallel and, consequently, represents the dividing line between the two signs of curvature. The relative aperture of the lens of this example is again 1:2.8 and the lens possesses a useful field angle of 60° and back focal length (BFL) of 75.758% of its equivalent focal length $f$.

The basic data for the lens of Example 4 are set out in the accompanying Table 10, in which the unit of linear measure is $f$, the equivalent focal length of the lens.

*Example 4.—Table 10*

| Element | Radius | Thickness $d$ or spacing $S$ | Index of refraction | Abbe number |
|---|---|---|---|---|
| $L_1$ | $R_1 = +0.42f$ | $d_1 = 0.149f$ | $n_1 = 1.717$ | $\nu_1 = 47.9$ |
|  | $R'_1 = \infty$ | $S_{1,2} = 0$ |  |  |
| $L_2$ | $R_2 = \infty$ | $d_2 = 0.020f$ | $n_2 = 1.651$ | $\nu_2 = 38.3$ |
|  | $R'_2 = +0.71f$ | $S_{2,3} = 0.001f$ |  |  |
| $L_3$ | $R_3 = +0.29f$ | $d_3 = 0.037f$ | $n_3 = 1.762$ | $\nu_3 = 26.5$ |
|  | $R'_3 = +0.22f$ | $S_{3,4} = 0.262f$ |  |  |
| $L_4$ | $R_4 = -0.23f$ | $d_4 = 0.010f$ | $n_4 = 1.762$ | $\nu_4 = 26.5$ |
|  | $R'_4 = +3.41f$ | $S_{4,5} = 0$ |  |  |
| $L_5$ | $R_5 = +3.41f$ | $d_5 = 0.083f$ | $n_5 = 1.665$ | $\nu_5 = 35.9$ |
|  | $R'_5 = -0.31f$ | $S_{5,6} = 0.001f$ |  |  |
| $L_6$ | $R_6 = -3.70f$ | $d_6 = 0.074f$ | $n_6 = 1.744$ | $\nu_6 = 44.9$ |
|  | $R'_6 = -0.45f$ |  |  |  |

Even with these basic data, the lens of Example 4 shows excellent correction of the third order Seidel-aberrations. With the final manufacturing data as given in the Table 11 following for a lens of equivalent focal length $f=100.0$ mm., an extraordinary degree of fine correction is achieved.

*Example 4.—Table 11*

| Element | Radius, mm. | Thickness $d$ or spacing $S$, mm. | Index of refraction | Abbe number |
|---|---|---|---|---|
| $L_1$ | $R_1 = +42.4798$ | $d_1 = 14.9323$ | $n_1 = 1.7170$ | $\nu_1 = 47.9$ |
|  | $R'_1 = \infty$ | $S_{1,2} = 0$ |  |  |
| $L_2$ | $R_2 = \infty$ | $d_2 = 1.9910$ | $n_2 = 1.6513$ | $\nu_2 = 38.3$ |
|  | $R'_2 = +70.9175$ | $S_{2,3} = 0.1224$ |  |  |
| $L_3$ | $R_3 = +29.1488$ | $d_3 = 3.7331$ | $n_3 = 1.7618$ | $\nu_3 = 26.5$ |
|  | $R'_3 = +21.9206$ | $S_{3,4} = 26.2310$ |  |  |
|  |  | $= 13.4390$ |  |  |
|  |  | $(b_1) + 12.7920\ (b_2)$ |  |  |
| $L_4$ | $R_4 = -23.2943$ | $d_4 = 0.9955$ | $n_4 = 1.7618$ | $\nu_4 = 26.5$ |
|  | $R'_4 = +341.471$ | $S_{4,5} = 0$ |  |  |
| $L_5$ | $R_5 = +341.471$ | $d_5 = 8.2625$ | $n_5 = 1.6645$ | $\nu_5 = 35.9$ |
|  | $R'_5 = -30.5813$ | $S_{5,6} = 0.1195$ |  |  |
| $L_6$ | $R_6 = -370.320$ | $d_6 = 7.4164$ | $n_6 = 1.7440$ | $\nu_6 = 44.9$ |
|  | $R'_6 = -45.2945$ |  |  |  |

The lens of Example 4 conforms to relations 2, 3 and 5 as is indicated in the following three equations:

$$(\phi_3 - \phi'_5) = 0.44059\Phi = 44.059\%\ \Phi$$

$$[|\phi'_3| - |\phi_4|] = 0.20495\Phi = 20.495\%\ \Phi$$

$$R_1 + |R'_6| = 87.743\ \text{mm.} = 87.74\%\ f$$

The foregoing Example 4 is moreover so designed that its front doublet is composed of lenses of particularly low refractive power, the combined effective power being positive. The negative meniscus which follows it also possesses a relatively low negative power. On the image side, i.e. in the rear assembly, relatively high lens powers are employed as will appear from the following Table 12 of the surface power sum distribution:

*Example 4.—Table 12*

| | |
|---|---|
| $\phi_{(1)} = +1.68786\Phi$ | $\phi_{(I)} = +0.76047\Phi$ |
| $\phi_{(2)} = -0.91839\Phi$ |  |
| $\phi_{(3)} = -0.86179\Phi$ | $= \phi_{(II)}$ |
| $\phi_{(4)} = -3.49342\Phi$ |  |
| $\phi_{(5)} = +2.36750\Phi$ | $\phi_{(III)} = -1.12592\Phi$ |
| $\phi_{(6)} = +1.44167\Phi$ | $= \phi_{(IV)}$ |

EXAMPLE 5

The lens of Example 5 again incorporates desirable constructional simplifications due to its use of the same radii of curvature for several surfaces. In the rear elements of both doublets there are employed glasses having indices below 1.65 for the yellow $d$-line of helium.

The relative aperture of the objective of Example 5 is 1:2.8 and the useful field angle amounts to 58°. On the image side, the intersection distance for a distant object amounts to 84.53% of the equivalent focal length. Consequently, this example is characterized by a particularly long free space on the image side which adapts it particularly for use in mirror reflex cameras.

Complete data for the lens of Example 5 are given in the accompanying Table 13, for a lens of equivalent focal length $f=100.0$ mm.

*Example 5.—Table 13*

| Element | Radius, mm. | Thickness $d$ or spacing $S$, mm. | Index of refraction | Abbe number |
|---|---|---|---|---|
| $L_1$ | $R_1 = +42.61765$ | $d_1 = 11.68507$ | $n_1 = 1.7170$ | $\nu_1 = 48.2$ |
|  | $R'_1 = -360.4458$ | $S_{1,2} = 0$ |  |  |
| $L_2$ | $R_2 = -360.4458$ | $d_2 = 1.30278$ | $n_2 = 1.6490$ | $\nu_2 = 38.2$ |
|  | $R_{12} = +72.23246$ | $S_{2,3} = 0.12888$ |  |  |
| $L_3$ | $R_3 = +30.76853$ | $d_3 = 3.49673$ | $n_3 = 1.7618$ | $\nu_3 = 26.5$ |
|  | $R'_3 = +22.70018$ | $S_{3,4} = 27.68711$ |  |  |
| $L_4$ | $R_4 = -24.25732$ | $d_4 = 1.29879$ | $n_4 = 1.7618$ | $\nu_4 = 26.5$ |
|  | $R'_4 = +360.4458$ | $S_{4,5} = 0$ |  |  |
| $L_5$ | $R_5 = +360.4458$ | $d_5 = 8.99159$ | $n_5 = 1.6398$ | $\nu_5 = 34.6$ |
|  | $R'_5 = -30.76853$ | $S_{5,6} = 0.09991$ |  |  |
| $L_6$ | $R_6 = -360.4458$ | $d_6 = 7.31316$ | $n_6 = 1.7440$ | $\nu_6 = 44.9$ |
|  | $R'_6 = -46.53649$ |  |  |  |

The objective system of Example 5 conforms to relations 2 and 3, as the following equations employing the corresponding values in Example 5 show:

$$(\phi_3 - \phi'_5) = 2.47591\Phi - 2.07940\Phi$$
$$= 0.39651\Phi = 39.651\%\ \Phi$$
$$[|\phi'_3| - |\phi_4|] = 3.35592\Phi - 3.14049\Phi$$
$$= 0.21543\Phi = 21.543\%\ \Phi$$

Moreover, the sum $R_1 + |R'_6|$ amounts, in Example 5, to 89.15414 mm. and hence to 89.1414% of the focal length of the system, well within the limits specified by relation 5.

In each of the foregoing Tables 5, 6, 8, 10, 11 and 13, the spacing $S_{3,4}$ is the diaphragm space, and in certain instances the desired position of the diaphragm therein has been indicated by the division of the diaphragm spacing $S_{3,4}$ into parts $b_1$ and $b_2$ respectively preceding and following the diaphragm position.

While the invention has been described hereinabove in terms of five examples which embody it, the scope of the invention itself is set forth in the accompanying claims.

I claim:

1. An objective lens of Gaussian type comprising, from front to back, a positive doublet component $L_I$ including front and rear elements $L_1$ and $L_2$, a negative meniscus component $L_{II}$ including an element $L_3$, and, behind the diaphragm position a negative doublet of meniscus shape $L_{III}$ including front and rear elements $L_4$ and $L_5$, and a positive rear component $L_{IV}$ including an element $L_6$, in which the absolute value of the sum of the powers of the first and last surfaces in front of the diaphragm and the absolute value of the sum of the powers of the first and last surfaces behind the diaphragm position both lie between $1.35\Phi$ and $1.9\Phi$ wherein $\Phi$ is the equivalent power of the lens, in which the absolute value of the difference between the power of the front surface of component $L_{II}$ and the power of the rear surface of component $L_{III}$ lies between $0.1\Phi$ and $0.48\Phi$, in which the absolute value of the difference between the power of the rear surface of component $L_{II}$ and the power of the front surface of component $L_{III}$ lies between $0.08\Phi$ and $0.24\Phi$, and in which the sum of the absolute values of the radii of curvature of the front surface of component $L_I$ and of the rear surface of component $L_{IV}$ lies between 85% of the equivalent focal length of the lens and 350% of the diameter of its entrance pupil.

2. A lens according to claim 1 having a relative aperture of 1:2.8, in which the sum of the absolute values of the radii of curvature of the front surface of component $L_I$ and of the rear surface of component $L_{IV}$ lies between 85% and 125% of the equivalent focal length of the lens.

3. A lens according to claim 1 in which the sums $\phi_{(1)}$ to $\phi_{(6)}$ respectively the powers of the front and rear surfaces of the elements $L_1$ to $L_6$ are related to the equivalent power $\Phi$ of the objective lens substantially as follows:

$$\phi_{(1)} = +1.9\Phi$$
$$\phi_{(2)} = -1.1\Phi$$
$$\phi_{(3)} = -0.9\Phi$$
$$\phi_{(4)} = -3.4\Phi$$
$$\phi_{(5)} = +2.3\Phi$$
$$\phi_{(6)} = +1.4\Phi$$

4. A lens according to claim 1 in which the powers $\phi_1$ to $\phi_6$ respectively of the front surfaces and $\phi'_1$ to $\phi'_6$ respectively of the rear surfaces of elements $L_1$ to $L_6$ are related to the equivalent power $\Phi$ of the objective lens substantially as follows:

$$\phi_1 = +1.68\Phi$$
$$\phi'_1 = +0.20\Phi$$
$$\phi_2 = -0.19\Phi$$
$$\phi'_2 = -0.89\Phi$$
$$\phi_3 = +2.47\Phi$$
$$\phi'_3 = -3.35\Phi$$
$$\phi_4 = -3.20\Phi$$
$$\phi'_4 = -0.20\Phi$$
$$\phi_5 = +0.18\Phi$$
$$\phi'_5 = +2.16\Phi$$
$$\phi_6 = -0.20\Phi$$
$$\phi'_6 = +1.58\Phi$$

5. An objective lens of Gaussian type comprising, from front to back, a positive doublet component including front and rear elements $L_1$ and $L_2$, a negative meniscus component including an element $L_3$, and, behind the diaphragm position a negative doublet of meniscus shape including front and rear elements $L_4$ and $L_5$, and a positive rear component including an element $L_6$, said objective lens having an equivalent focal length $f$, said elements conforming substantially to the following conditions:

| Element | Radius | Thickness $d$ or spacing $S$ | Index of refraction | Abbe number |
|---|---|---|---|---|
| $L_1$ | $R_1 = +0.43f$ | $d_1 = 0.117f$ | $n_1 = 1.718$ | $\nu_1 = 50.2$ |
|  | $R'_1 = 3.60f$ | $S_{1,2} = 0.001f$ |  |  |
| $L_2$ | $R_2 = -3.50f$ | $d_2 = 0.013f$ | $n_2 = 1.664$ | $\nu_2 = 42.0$ |
|  | $R'_2 = +0.74f$ | $S_{2,3} = 0.001f$ |  |  |
| $L_3$ | $R_3 = +0.306f$ | $d_3 = 0.048f$ | $n_3 = 1.759$ | $\nu_3 = 26.6$ |
|  | $R'_3 = +0.227f$ | $S_{3,4} = 0.277f$ |  |  |
| $L_4$ | $R_4 = -0.237f$ | $d_4 = 0.013f$ | $n_4 = 1.761$ | $\nu_4 = 26.4$ |
|  | $R'_4 = +3.80f$ | $S_{4,5} = 0.001f$ |  |  |
| $L_5$ | $R_5 = +3.70f$ | $d_5 = 0.083f$ | $n_5 = 1.662$ | $\nu_5 = 36.0$ |
|  | $R'_5 = -0.307f$ | $S_{5,6} = 0.004f$ |  |  |
| $L_6$ | $R_6 = -3.60f$ | $d_6 = 0.061f$ | $n_6 = 1.742$ | $\nu_6 = 45.0$ |
|  | $R'_6 = -0.469f$ |  |  |  | wherein $R_1$ to $R_6$ are the radii of the front surfaces, $R'_1$ to $R'_6$ are the radii of the rear surfaces, $d_1$ to $d_6$ are the axial thicknesses, $S_{1,2}$ to $S_{5,6}$ are the axial spacings, $n_1$ to $n_6$ are the indices of refraction, and $\nu_1$ to $\nu_6$ are the Abbe numbers of said elements $L_1$ to $L_6$ respectively.

6. An objective lens of Gaussian type comprising, from front to back, a positive doublet component including front and rear elements $L_1$ and $L_2$, a negative meniscus component including an element $L_3$, and, behind the diaphragm position a negative doublet of meniscus shape including front and rear elements $L_4$ and $L_5$, and a positive rear component including an element $L_6$, said objective lens having an equivalent focal length $f$, said elements conforming substantially to the following conditions:

| Element | Radius, Percent $f$ | Thickness $d$ or spacing $S$, Percent $f$ | Index of refraction | Abbe number |
|---|---|---|---|---|
| $L_1$ | $R_1 = 42.8325$ | $d_1 = 11.6958$ | $n_1 = 1.7200$ | $\nu_1 = 50.3$ |
|  | $R'_1 = -360.783$ | $S_{1,2} = 0$ |  |  |
| $L_2$ | $R_2 = -360.783$ | $d_2 = 1.3042$ | $n_2 = 1.6676$ | $\nu_2 = 41.9$ |
|  | $R'_2 = +74.7543$ | $S_{2,3} = 0.1294$ |  |  |
| $L_3$ | $R_3 = +30.7973$ | $d_3 = 4.7330$ | $n_3 = 1.7618$ | $\nu_3 = 26.5$ |
|  | $R'_3 = +22.7214$ | $S_{3,4} = 27.7134$ |  |  |
|  |  | $= 14.1444$ $(b_1) + 13.5690$ $(b_2)$ |  |  |
| $L_4$ | $R_4 = -23.7682$ | $d_4 = 1.2989$ | $n_4 = 1.7618$ | $\nu_4 = 26.5$ |
|  | $R'_4 = +360.783$ | $S_{4,5} = 0$ |  |  |
| $L_5$ | $R_5 = +360.783$ | $d_5 = 8.3722$ | $n_5 = 1.6645$ | $\nu_5 = 35.9$ |
|  | $R'_5 = -30.7973$ | $S_{5,6} = 0.4102$ |  |  |
| $L_6$ | $R_6 = -360.783$ | $d_6 = 6.1214$ | $n_6 = 1.7440$ | $\nu_6 = 44.9$ |
|  | $R'_6 = -46.8675$ |  |  |  | wherein $R_1$ to $R_6$ are the radii of the front surfaces, $R'_1$ to $R'_6$ are the radii of the rear surfaces, $d_1$ to $d_6$ are the axial thicknesses, $S_{1,2}$ to $S_{5,6}$ are the axial spacings, $n_1$ to $n_6$ are the indices of refraction, and $\nu_1$ to $\nu_6$ are the Abbe numbers of said elements $L_1$ to $L_6$ respectively.

7. A lens according to claim 1 in which the powers $\phi_1$ to $\phi_6$ respectively of the front surfaces and $\phi'_1$ to $\phi'_6$ respectively of the rear surfaces of elements $L_1$ to $L_6$ are related to the equivalent power $\Phi$ of the objective lens substantially as follows:

$$\phi_1 = +1.647153\Phi$$
$$\phi'_1 = +0.195513\Phi$$
$$\phi_2 = -0.181248\Phi$$
$$\phi'_2 = -0.874924\Phi$$
$$\phi_3 = +2.423379\Phi$$
$$\phi'_3 = -3.284749\Phi$$
$$\phi_4 = -3.073838\Phi$$
$$\phi'_4 = +0.281633\Phi$$
$$\phi_5 = +0.245662\Phi$$
$$\phi'_5 = +2.113855\Phi$$
$$\phi_6 = -0.202030\Phi$$
$$\phi'_6 = +1.536121\Phi$$

8. An objective lens of Gaussian type comprising, from front to back, a positive doublet component including front and rear elements $L_1$ and $L_2$, a negative meniscus component including an element $L_3$, and, behind the diaphragm position a negative doublet of meniscus shape including front and rear elements $L_4$ and $L_5$, and a positive rear component including an element $L_6$, said objective lens having an equivalent focal length $f$, said elements conforming substantially to the following conditions:

| Element | Radius, Percent $f$ | Thickness $d$ or spacing $S$, Percent $f$ | Index of refraction | Abbe number |
|---|---|---|---|---|
| $L_1$ | $R_1 = +43.7118$ | $d_1 = 11.9385$ | $n_1 = 1.7200$ | $\nu_1 = 50.3$ |
| | $R'_1 = -368.2624$ | $S_{1,2} = 0$ | | |
| $L_2$ | $R_2 = -368.2624$ | $d_2 = 1.3310$ | $n_2 = 1.6676$ | $\nu_2 = 41.9$ |
| | $R'_2 = +76.3037$ | $S_{2,3} = 0.1317$ | | |
| $L_3$ | $R_3 = +31.4355$ | $d_3 = 3.5726$ | $n_3 = 1.7618$ | $\nu_3 = 26.5$ |
| | $R'_3 = +23.1920$ | $S_{3,4} = 28.2875$ | | |
| $L_4$ | $R_4 = -24.7833$ | $d_4 = 1.3270$ | $n_4 = 1.7618$ | $\nu_4 = 26.5$ |
| | $R'_4 = +270.4937$ | $S_{4,5} = 0$ | | |
| $L_5$ | $R_5 = +270.4937$ | $d_5 = 8.9620$ | $n_5 = 1.6645$ | $\nu_5 = 35.9$ |
| | $R'_5 = -31.4355$ | $S_{5,6} = 0.1429$ | | |
| $L_6$ | $R_6 = -368.2624$ | $d_6 = 7.1655$ | $n_6 = 1.7440$ | $\nu_6 = 44.9$ |
| | $R'_6 = -48.4337$ | | | | wherein $R_1$ to $R_6$ are the radii of the front surfaces, $R'_1$ to $R'_6$ are the radii of the rear surfaces, $d_1$ to $d_6$ are the axial thicknesses, $S_{1,2}$ to $S_{5,6}$ are the axial spacings, $n_1$ to $n_6$ are the indices of refraction, and $\nu_1$ to $\nu_6$ are the Abbe numbers of said elements $L_1$ to $L_6$ respectively.

9. A lens according to claim 1 in which the sums $\phi_{(1)}$ to $\phi_{(6)}$ respectively the powers of the front and rear surfaces of the elements $L_1$ to $L_6$ are related to the equivalent power $\Phi$ of the objective lens substantially as follows:

$$\phi_{(1)} = +1.68786\Phi$$
$$\phi_{(2)} = -0.91839\Phi$$
$$\phi_{(3)} = -0.86179\Phi$$
$$\phi_{(4)} = -3.49342\Phi$$
$$\phi_{(5)} = +2.36750\Phi$$
$$\phi_{(6)} = +1.44167\Phi$$

10. An objective lens of Gaussian type comprising, from front to back, a positive doublet component including front and rear elements $L_1$ and $L_2$, a negative meniscus component including an element $L_3$, and, behind the diaphragm position a negative doublet of meniscus shape including front and rear elements $L_4$ and $L_5$, and a positive rear component including an element $L_6$, said objective lens having an equivalent focal length $f$, said elements conforming substantially to the following conditions:

| Element | Radius | Thickness $d$ or spacing $S$ | Index of refraction | Abbe number |
|---|---|---|---|---|
| $L_1$ | $R_1 = +0.42f$ | $d_1 = 0.149f$ | $n_1 = 1.717$ | $\nu_1 = 47.9$ |
| | $R'_1 = \infty$ | $S_{1,2} = 0$ | | |
| $L_2$ | $R_2 = \infty$ | $d_2 = 0.020f$ | $n_2 = 1.651$ | $\nu_2 = 38.3$ |
| | $R'_2 = +0.71f$ | $S_{2,3} = 0.001f$ | | |
| $L_3$ | $R_3 = +0.29f$ | $d_3 = 0.037f$ | $n_3 = 1.762$ | $\nu_3 = 26.5$ |
| | $R'_3 = +0.22f$ | $S_{3,4} = 0.262f$ | | |
| $L_4$ | $R_4 = -0.23f$ | $d_4 = 0.010f$ | $n_4 = 1.762$ | $\nu_4 = 2.5$ |
| | $R'_4 = +3.41f$ | $S_{4,5} = 0$ | | |
| $L_5$ | $R_5 = +3.41f$ | $d_5 = 0.083f$ | $n_5 = 1.665$ | $\nu_5 = 35.9$ |
| | $R'_5 = -0.31f$ | $S_{5,6} = 0.001f$ | | |
| $L_6$ | $R_6 = -3.70f$ | $d_6 = 0.074f$ | $n_6 = 1.744$ | $\nu_6 = 44.9$ |
| | $R'_6 = -0.45f$ | | | | wherein $R_1$ to $R_6$ are the radii of the front surfaces, $R'_1$ to $R'_6$ are the radii of the rear surfaces, $d_1$ to $d_6$ are the axial thicknesses, $S_{1,2}$ to $S_{5,6}$ are the axial spacings, $n_1$ to $n_6$ are the indices of refraction, and $\nu_1$ to $\nu_6$ are the Abbe numbers of said elements $L_1$ to $L_6$ respectively.

11. An objective lens of Gaussian type comprising, from front to back, a positive doublet component including front and rear elements $L_1$ and $L_2$, a negative meniscus component including an element $L_3$, and, behind the diaphragm position a negative doublet of meniscus shape including front and rear elements $L_4$ and $L_5$, and a positive rear component including an element $L_6$, said objective lens having an equivalent focal length $f$, said elements conforming substantially to the following conditions:

| Element | Radius, percent $f$ | Thickness $d$ or spacing $S$, percent $f$ | Index of refraction | Abbe number |
|---|---|---|---|---|
| $L_1$ | $R_1 = +42.4798$ | $d_1 = 14.9323$ | $n_1 = 1.7170$ | $\nu_1 = 47.9$ |
| | $R'_1 = \infty$ | $S_{1,2} = 0$ | | |
| $L_2$ | $R_2 = \infty$ | $d_2 = 1.9910$ | $n_2 = 1.6513$ | $\nu_2 = 38.3$ |
| | $R'_2 = +70.9175$ | $S_{2,3} = 0.1224$ | | |
| $L_3$ | $R_3 = +29.1488$ | $d_3 = 3.7331$ | $n_3 = 1.7618$ | $\nu_3 = 26.5$ |
| | $R'_3 = +21.9206$ | $S_{3,4} = 26.2310$ | | |
| | | $(b_1) = 13.4390$ | | |
| | | $(b_1) + 12.7920\ (b_2)$ | | |
| $L_4$ | $R_4 = -23.2943$ | $d_4 = 0.9955$ | $n_4 = 1.7618$ | $\nu_4 = 26.5$ |
| | $R'_4 = +341.471$ | $S_{4,5} = 0$ | | |
| $L_5$ | $R_5 = +341.471$ | $d_5 = 8.2625$ | $n_5 = 1.6645$ | $\nu_5 = 35.9$ |
| | $R'_5 = -30.5813$ | $S_{5,6} = 0.1195$ | | |
| $L_6$ | $R_6 = -370.320$ | $d_6 = 7.4164$ | $n_6 = 1.7440$ | $\nu_6 = 44.9$ |
| | $R'_6 = -45.2945$ | | | | wherein $R_1$ to $R_6$ are the radii of the front surfaces, $R'_1$ to $R'_6$ are the radii of the rear surfaces, $d_1$ to $d_6$ are the axial thicknesses, $S_{1,2}$ to $S_{5,6}$ are the axial spacings, $n_1$ to $n_6$ are the indices of refraction, and $\nu_1$ to $\nu_6$ are the Abbe numbers of said elements $L_1$ to $L_6$ respectively.

12. An objective lens of Gaussian type comprising, from front to back, a positive doublet component including front and rear elements $L_1$ and $L_2$, a negative meniscus component including an element $L_3$, and, behind the diaphragm position a negative doublet of meniscus shape including front and rear elements $L_4$ and $L_5$, and a positive rear component including an element $L_6$, said objective lens having an equivalent focal length $f$, said elements conforming substantially to the following conditions:

| Element | Radius, percent $f$ | Thickness $d$ or spacing $S$, percent $f$ | Index of refraction | Abbe number |
|---|---|---|---|---|
| $L_1$ | $R_1 = +42.61765$ $R'_1 = -360.4458$ | $d_1 = 11.68507$ $S_{1,2} = 0$ | $n_1 = 1.7170$ | $\nu_1 = 48.2$ |
| $L_2$ | $R_2 = -360.4458$ $R'_2 = +72.23246$ | $d_2 = 1.30278$ $S_{2,3} = 0.12888$ | $n_2 = 1.6490$ | $\nu_2 = 38.2$ |
| $L_3$ | $R_3 = +30.76853$ $R'_3 = +22.70018$ | $d_3 = 3.49673$ $S_{3,4} = 27.68711$ | $n_3 = 1.7618$ | $\nu_3 = 26.5$ |
| $L_4$ | $R_4 = -24.25732$ $R'_4 = +360.4458$ | $d_4 = 1.29879$ $S_{4,5} = 0$ | $n_4 = 1.7618$ | $\nu_4 = 26.5$ |
| $L_5$ | $R_5 = +360.4458$ $R'_5 = -30.76853$ | $d_5 = 8.99159$ $S_{5,6} = 0.09991$ | $n_5 = 1.6398$ | $\nu_5 = 34.6$ |
| $L_6$ | $R_6 = -360.4458$ $R'_6 = -46.53649$ | $d_6 = 7.31316$ | $n_6 = 1.7440$ | $\nu_6 = 44.9$ | wherein $R_1$ to $R_6$ are the radii of the front surfaces, $R'_1$ to $R'_6$ are the radii of the rear surfaces, $d_1$ to $d_6$ are the axial thicknesses, $S_{1,2}$ to $S_{5,6}$ are the axial spacings, $n_1$ to $n_6$ are the indices of refraction, and $\nu_1$ to $\nu_6$ are the Abbe numbers of said elements $L_1$ to $L_6$ respectively.

References Cited in the file of this patent

UNITED STATES PATENTS

| | | |
|---|---|---|
| 2,171,640 | Berek | Sept. 5, 1939 |
| 2,649,023 | Tronnier | Aug. 18, 1953 |
| 2,744,447 | Berger et al. | May 8, 1956 |
| 2,748,656 | Berger et al. | June 5, 1956 |

FOREIGN PATENTS

| | | |
|---|---|---|
| 480,643 | Great Britain | Feb. 25, 1938 |
| 1,101,508 | France | Apr. 20, 1955 |

UNITED STATES PATENT OFFICE

CERTIFICATE OF CORRECTION

Patent No. 3,049,975　　　　　　　　　　　August 21, 1962

Albrecht Wilhelm Tronnier

It is hereby certified that error appears in the above numbered patent requiring correction and that the said Letters Patent should read as corrected below.

Column 10, line 47, for "$R_{12}$" read -- $R'_2$ --; column 12, line 10, for "$R'_1 = 3.60f$" read -- $R'_1 = -3.60f$ --; line 47, for "$R_1 = 42.8325$" read -- $R_1 = +42.8235$ --.

Signed and sealed this 4th day of December 1962.

(SEAL)
Attest:

ERNEST W. SWIDER
Attesting Officer

DAVID L. LADD
Commissioner of Patents